United States Patent [19]
Smith et al.

[11] Patent Number: 4,947,422
[45] Date of Patent: Aug. 7, 1990

[54] PERSONALIZED TELEPHONE FOR AUTOMATIC ACCESS TO OPERATOR SERVICES

[75] Inventors: Benjamin A. Smith, Celeste; Steven W. Burnett, Richardson, both of Tex.

[73] Assignee: Digital Telecommunications Systems, Inc., Dallas, Tex.

[21] Appl. No.: 427,972

[22] Filed: Oct. 26, 1989

Related U.S. Application Data

[63] Continuation of Ser. No. 164,505, Mar. 7, 1988, abandoned.

[51] Int. Cl.$^5$ ............................................. H04M 1/274
[52] U.S. Cl. ..................................... 379/200; 379/355
[58] Field of Search ............... 379/355, 354, 356, 357, 379/358, 359, 200, 127, 188, 199, 130, 131, 112

[56] References Cited

U.S. PATENT DOCUMENTS 4,468,529  8/1984  Samuel ................................. 379/112
4,768,227  8/1988  Dively ................................. 379/130

OTHER PUBLICATIONS

Telephony, "Big Atlanta Hotel Uses Automation to Make Guest Feel Welcome", J. Nichols, 6/6/83, pp. 30-36, 379/112, Welcomm System by Hitachi.

Primary Examiner—James L. Dwyer
Attorney, Agent, or Firm—Richards, Medlock & Andrews

[57] ABSTRACT

A telephone set for automatically accessing operator service facilities in response to a user initiating a long distance type of telephone call. The access of the operator services is automatic and transparent to the user. After the user dials the "1" or similar long distance designation, the area code and a seven-digit telephone number of the called party, the telephone set stores such information, and in response thereto outpulses a predefined telephone number of the operator services. The telephone set responds to a precision dial tone transmitted as an acknowledgment by the operator services, and outpulses first an internally stored telephone set identificaiton number, followed by the area code and seven-digit number input by the calling party. Such outpulsed information appears on a video terminal of the operator services, whereupon the calling party and an operator can discuss billing of the telephone call, as well as completion thereof to the called party.

52 Claims, 5 Drawing Sheets

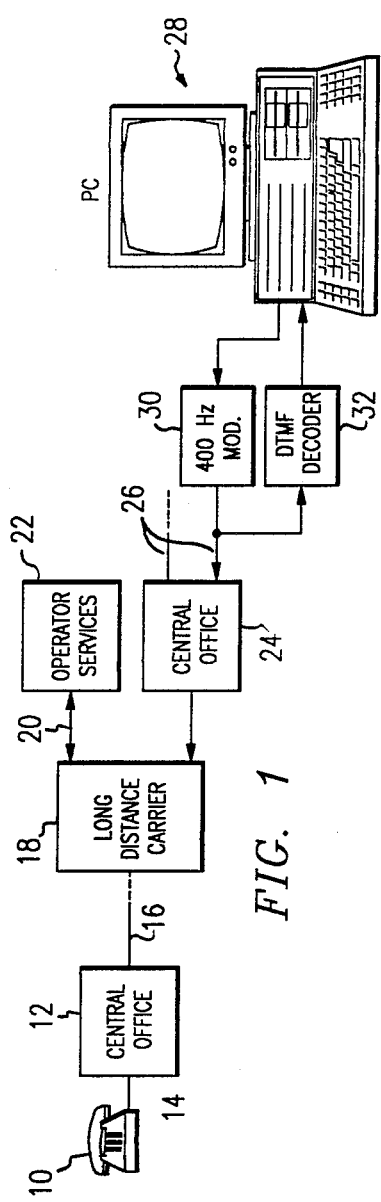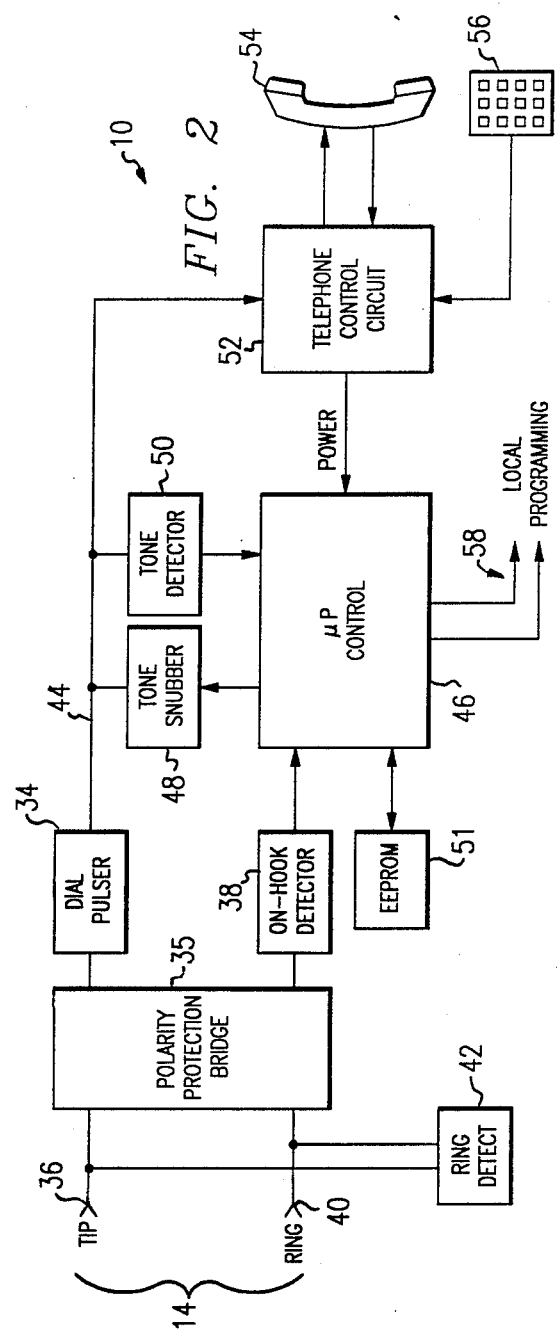

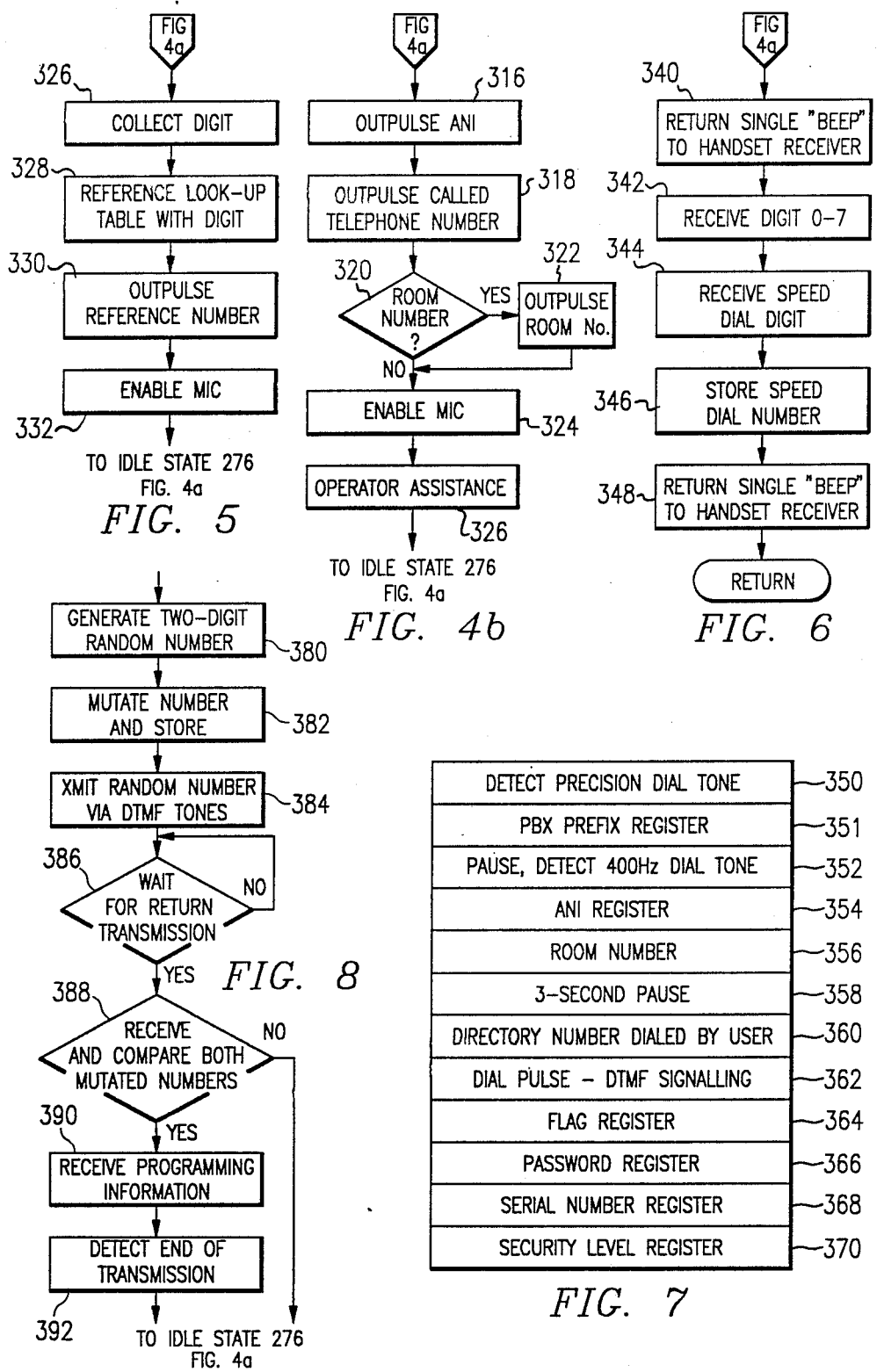

PERSONALIZED TELEPHONE FOR AUTOMATIC ACCESS TO OPERATOR SERVICES

This application is a continuation of application Ser. No. 164,505, filed Mar. 7, 1988 now abandoned.

TECHNICAL FIELD OF THE INVENTION

The present invention relates in general to telecommunication methods and apparatus, and more particularly relates to the provision of telephone equipment for allowing the completion of long distance or toll telephone calls and the efficient allocation of charges therefor.

BACKGROUND OF THE INVENTION

The expenses incurred in connection with a long distance or toll-type telephone call are traditionally charged to the owner of the telephone set in the case of private telephone sets, or otherwise to the business entity associated with the telephone. The charge-back of the expenses for completing such toll-type telephone calls has been handled with a certain degree of administrative efficiency thus far, in that the individuals and businesses are well defined entities for billing purposes. Because of the increased usage and need for long distance communications, the additional burden imposed on the telephone operating companies has necessitated the recovery of the costs incurred in connection with operator services. For example, a flat rate charge is now imposed on the user for employing an operator to complete a long distance call, or to use long distance information services.

In order to further promote long distance calling, and the billing thereof, conventional credit cards or telephone company issued cards are available for billing the call thereto. While some long distance telephone calls can be completed and billed without operator assistance, such as by keying in the pertinent telephone and credit card numbers, many toll calls yet require operator assistance.

The noted advancements in the telecommunications industry, have, in certain instances, interfered with the flexibility and completion of toll-type telephone calls. For example, many situations exist in which operator-assisted long distance telephone calls are not allowed to be completed, such as by patrons of an establishment, even though the calling party has the appropriate credit card. In this situation, the owner of the establishment on whose premises the telephone may be installed derives no revenue from the long distance call, and indeed, incurs an expense for the operator assistance. This expense is generally billed to the owner of the telephone set.

As a result of the increased long distance telephone business, operator services are now provided by companies other than the local or nationally known telephone companies. Network access to such operator services is also customarily provided through public or private carrier systems so that long distance telephone calls can be completed with the assistance of such operator services. Toll-type telephone calls made through the use of the noted operator services are routinely billed to users or other business entities who are assigned an identity or billing code.

In order to further facilitate the ease with which long distance telephone calls are made, and to promote the generation of revenues therefrom, a need exists for a technique to automatically identify the telephone set itself, and thus the proprietor thereof so that the operator service organization can appropriate the billing charges so that the owner of the telephone set can recover all costs, as well as receive a profit from the use of the telephone set. This would be especially advantageous in hotels, hospitals, dormitories and other similar institutions where the users of the telephone are fairly well identifiable. By assigning specially programmed telephones to the patrons of such institutions, and on the automatic transmission of such information to the operator services, such services can allocate the billing charges efficiently and accurately, without loss of revenue to the institution.

SUMMARY OF THE INVENTION

In accordance with the present invention, the telephone apparatus and communication methods are provided which substantially reduce or eliminate the disadvantages and shortcomings associated with the prior art techniques. According to the invention, a programmable telephone set is disclosed for permitting a wide range of telecommunication functions, including the storing therein of an identification number which is transmitted along with dialling information to the operator services for providing information for the efficient and reliable appropriation of costs for the telephone call.

The telephone set of the invention further includes the capability of programming a number of registers therein for directing and controlling the outpulsing of dialling information. In particular, the telephone set of the invention can be programmed to automatically outpulse the telephone number of the operator services, detect an acknowledgment of a request from the operator services, and then outpulse the telephone identification code as well as long distance dialling information input by the calling party. The telephone set is also provided with the capability of programming therein various codes to alter or direct the outpulsing sequence and the type of digits. In hotels, for example, the telephone of each room can be programmed to include the room number, so that any long distance calls made via the operator services can be billed quickly and directly back to the hotel for billing to the appropriate patrons.

According to the preferred embodiment of the invention, the telephone set includes a circuit responsive to off-hook conditions to reset the processor and thereby prevent unauthorized toll calls. Provided also is a snubber circuit for preventing certain audio tones from being output on a telephone line, but allows the user of the telephone to faintly hear such tones. The circuits of the telephone set are line powered in such a manner as to reduce load current by placing circuit blocks in series, rather than dissipating power in load resistors. Particularly, the microprocessor receives power in series with a telephone control chip.

Provisions are also made for programming the registers of the telephone set from local or remote programming facilities. When utilizing remote programming facilities, security codes are passed between the telephone set and the programming facilities to verify an authentic programming mode. Thereafter, coded 400 Hz dial tones are transmitted to the telephone set to program the registers, while DTMF tones are passed to the programming facility for verifying the programmed information.

BRIEF DESCRIPTION OF THE DRAWINGS

Further features and advantages will become apparent from the following and more particular description of the preferred embodiment of the invention, as illustrated in the accompanying drawings in which like reference characters refer to the same parts or elements throughout the views, and in which:

FIG. 1 illustrates an application or environment in which the present invention may be advantageously practiced;

FIG. 2 is a block diagram of the telephone set of the invention, illustrating the various functions thereof;

FIGS. 4–6 are program flow charts for programming the various features into the telephone set;

FIG. 7 illustrates a number of programmable registers employed by the processor of the telephone set of the invention for controlling the call processing sequence; and FIG. 8 is a program flow chart of the operations carried out by the telephone set of the invention in connection with the remote programming thereof.

DETAILED DESCRIPTION OF THE INVENTION

Figure 3A:
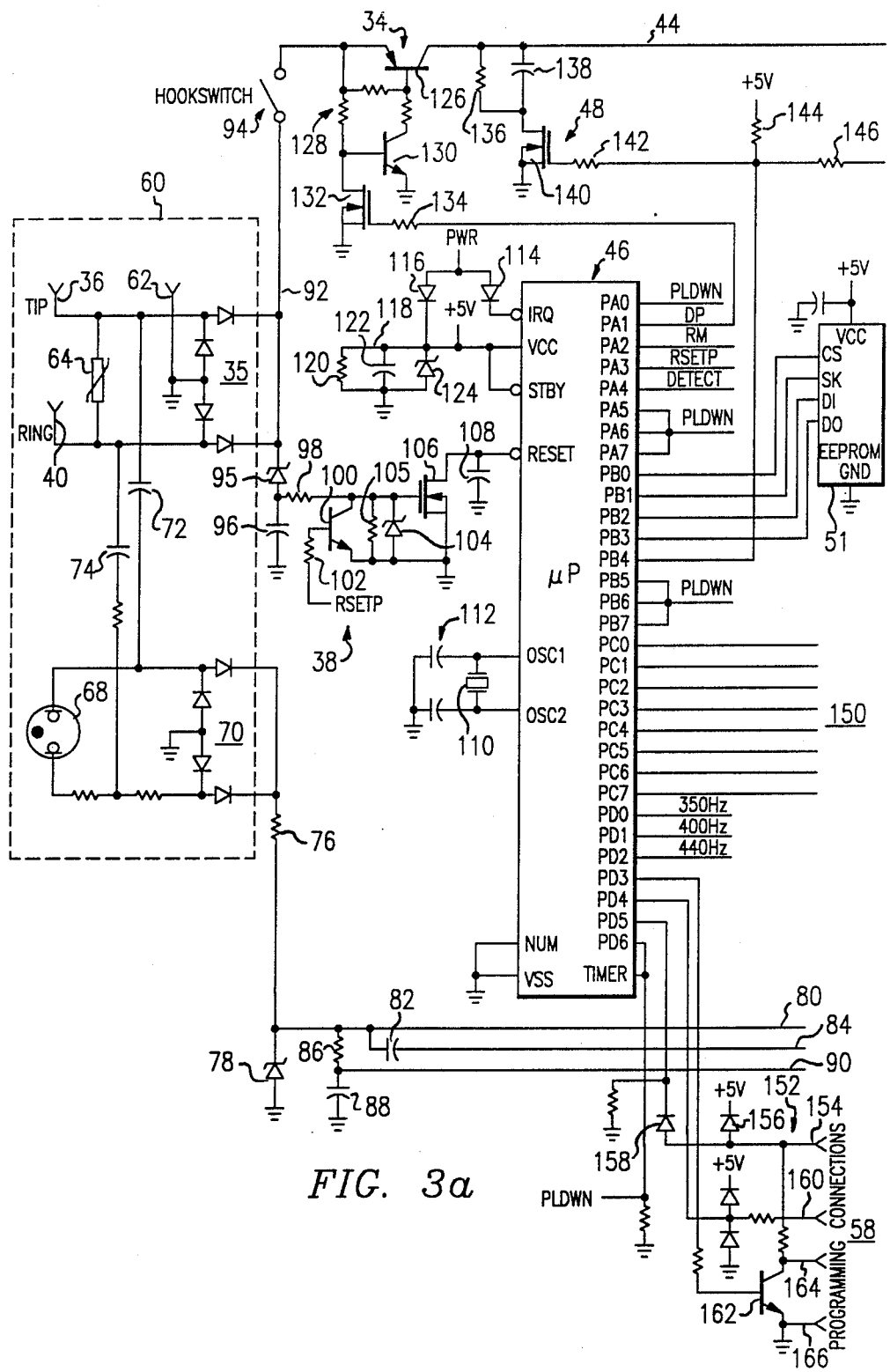
FIGS. 3a and 3b are detailed electrical schematic diagrams of the preferred embodiment of the invention.

FIG. 1 illustrates an environment in which the telephone set of the invention may be advantageously utilized. The telephone set 10 is shown connected to a local central office 12 by a subscriber line 14. Conventional central offices 12 are adapted for servicing many other business and private types of telephone sets. The central office 12 is connected by a toll trunk 16 to a long distance carrier 18. The long distance carrier 18 may comprise facilities of one of the major telephone operating companies, or may be a private carrier. The long distance carrier 18 is, in turn, connected by telecommunication lines 20 to the operator services 22. Such operator services 22 may be located locally, or may be located in geographically remote area and accessed via long distance communication facilities. Connected to the long distance carrier 18 may be yet other central offices, such as illustrated by numeral 24, which have subscriber lines 26 servicing subscribers situated in community of the central office 24. Facilities for remotely programming the telephone set 10 may comprise a personal computer 28 connected to the central office 24 through transmission equipment comprising a 400 hertz modulator 30 and a dual-tone multifrequency (DTMF) decoder 32.

In completing an exemplary long distance telephone call employing the telephone set 10 of the invention, a user removes the handset, listens for central office dial tone, and then dials "0" for operator, the area code and the 7-digit telephone number associated with the called party. Upon receipt of this information, the telephone set 10 is programmed to automatically outpulse the telephone number associated with the operator services 22, generally a "1" followed by a ten-digit "800" series directory number. The central office 12 recognizes the noted digit sequence as a long distance number, whereupon the trunk 16 to the long distance carrier 18 is seized and such number is retransmitted by the central office 12. In turn, the long distance carrier 18 repeats such "800" series number for accessing the operator services 22. A talking path is then established between the telephone set 10 and the operator services 22.

In response to a request for service by the telephone set 10, equipment located at the operator services premises 22 transmits a precision dial tone to acknowledge such request. A detect circuit in the telephone set 10 detects the existence of the precision dial tone on the subscriber line 14, whereupon an identification code identifying the telephone set 10 is outpulsed, together with the 10- or 11-digit long distance telephone number input by the calling party. The outpulsed information is then transmitted through the central office 12 and the long distance carrier 18 to the operator services 22, and decoded for visual presentation to an operator or service attendant. With such information, the attendant can then verbally inquire as to the method of payment for the toll call, and in the event of a credit card type call, the user is requested to input the credit card number via the keypad of the telephone set 10. The operator records such information and provides further assistance in completing the long distance call through other local or long distance facilities extended to the called party.

According to another feature of the invention, the telephone set 10 can be programmed either locally, or by way of remote programming facilities, such as indicated by the personal computer 28. The 400 hertz modulator 30 and the DTMF decoder 32, associated with the computer 28, are effective both in transmitting coded signals to the telephone set 10 and receiving signals therefrom to achieve the appropriate programming thereof.

FIG. 2 is a block diagram of the telephone set 10 of the invention. As major components of the telephone set 10, there is provided a dial pulser 34 connected through a polarity protection bridge 35 to a subscriber line tip conductor 36 and a subscriber line ring conductor 40. An on-hook detector 38 is similarly connected through the bridge 35 to the subscriber line 14. The polarity protection bridge 35 assures that both the dial pulses 34 and the on-hook detector 38 are connected to the more positive of the tip and ring conductors 36 and 40, which is generally the ring conductor. A ring detection circuit 42 is provided with connections to both the tip 36 and ring 40 of the subscriber line 14. The dial pulser 34 has an output 44 which is connected to a microprocessor 46 by a tone snubber 48 and a tone detector 50. The on-hook detector 38 is also provided with connections to the microprocessor 46. A telephone control circuit 52 receives signal and electrical power from the subscriber line 14 through the dial pulser 34. Excess power not used by the telephone control circuit 52 is delivered to the microprocessor 46, as well as routed to other circuits (not shown) of the telephone set 10. The telephone control circuit 52 is of conventional design, including a DTMF dialer, a tone ringer, a keypad interface, a microprocessor interface and a speech network. The telephone control circuit 52 is connected to the handset 54 of the telephone set 10 to provide transmit and receiver audio signals, power, side tone and other signals conventionally supplied to a telephone handset 10. A conventional keypad 56 is connected to the telephone control circuit 52 for coupling dialled DTMF signals to the subscriber line 14, as well as to provide the mechanism for programming certain registers of the microprocessor control 46. The microprocessor control 46 can also be programmed by remote equipment, utilizing either the subscriber line 14 or by remote programming terminals 58.

The operation and programming of the telephone set 10 of the invention is described in more detail in connection with FIGS. 3a and 3b. Turning now to FIG. 3a, a portion of the telephone set 10 is illustrated, including a high voltage input section 60 for converting the voltages on the tip and ring conductors 36 and 40 into voltages suitable for sensing and for processing by the telephone set 10. The high voltage section 60 includes connectorized lugs for the tip and ring conductors 36 and 40, as well as a telephone set ground conductor 62. A metal oxide varistor 64 is connected across the tip and ring conductors 36 and 40 to snub transients which may occur on the subscriber line 14. The polarity protection bridge 35 is connected between the tip and ring conductors 36 and 40 for rectifying subscriber line loop currents to thereby render the telephone set 10 insensitive to the different polarities with which central offices may supply DC loop currents to the subscriber line 14.

Also forming part of the high voltage section 60 of the telephone set 10 is a neon indicator lamp 68 and a full-wave diode rectifier 70 for converting high voltage ringing current supplied by the central office 12 over the subscriber line 14 into DC voltages for detecting incoming calls. The rectifier diodes 70 are coupled to the tip and ring conductors 36 and 40 by capacitors 72 and 74 to provide DC isolation between the tip and ring conductors 36 and 40 and the diode rectifiers 70. The high voltage section 60 may be constructed as a small modularized encapsulated component to conserve component space, thereby allowing the telephone set 10 to be made small in size and easily manufacturable.

The diode bridge 70 provides a unidirectional DC output indication of ringing current, coupled through a resistor 76, and a series Zener diode 78 connected to ground, and having a 30 volt reverse breakdown voltage. Resistor 76 and diode 78 are connected by a conductor 80 to the telephone control circuit 52. Conductor 80 thereby carries full-wave rectified signals clipped to a maximum magnitude of about 30 volts due to the Zener diode 78. Resistor 76 prevents the full amplitude of low level AC signals, such as speech signals and DTMF signals presented on the subscriber line 14, from being coupled through the rectifier section 70 to the conductor 80. The full-wave rectified and clipped signals appearing on conductor 80 are capacitively coupled by capacitor 82 to a second conductor 84 which is also coupled to the telephone control circuit 52. A series-connected resistor 86 and capacitor 88 are connected between conductor 80 and ground. At the junction of such component connection is a third conductor 90, also connected to the telephone control circuit 52.

With regard to the tip and ring conductor connections to the full-wave polarity protection bridge 35, the rectified signals appearing on an output conductor thereof are directed along two paths. Such signals are coupled to a hook switch 94 which functions to close the subscriber line loop when the handset 54 of the telephone set 10 is lifted off-hook. As is conventional, the hook switch 94 is open when the handset 54 is resting in the cradle of the telephone set 10, and is closed when the handset 54 is lifted off-hook to either receive incoming telephone calls or to make outgoing calls. Speech signals, DTMF signals, and DC loop current voltages are carried by conductor 92 and hook switch 94 through the dial pulser circuit 34 to an internal signal conductor 44.

The noted subscriber line signals are also coupled to the on-hook detector 38. The on-hook detector 38 is constructed using a series-connected 30 volts Zener diode 95 and capacitor 96 connected between the conductor 92 and ground. The junction of the Zener diode 95 and capacitor 96 is connected through a resistor 98 to the collector of an NPN transistor 100. The base of the transistor 100 is connected through a resistor 102 to a reset processor (RSETP) input of the microprocessor control 46. The collector and emitter of the transistor 100 are shunted by a 5.1 volt Zener diode 104 and a resistor 105, whereas the emitter of transistor 100 is grounded. The Zener diode 104 functions to prevent latch-up of the MOS transistor 106. The collector of transistor 100 drives the gate of an N-channel MOS transistor 106, the source of which grounded. The drain of the MOS transistor 106 is connected to a reset input of the microprocessor control 46. A 2.2 microfarad capacitor 108 functions to delay resetting of the microprocessor 46 a short time period after power-up thereof.

In the preferred embodiment of the invention, the microprocessor 46 is identified as integrated circuit HD6305VO, manufactured by Hitachi. With regard to the circuits supporting the operation of the microprocessor 46, there is illustrated a crystal 110 with capacitors 112 connected to the OSC1 and OSC2 terminals of the microprocessor 46 for providing a 500 kHz fundamental frequency. Unregulated power (PWR) is supplied to an IRQ input of the microprocessor 46, via a diode 114. The unregulated supply voltage PWR is connected through a diode 116 to a regulated +5 V supply bus 118, which voltage is also supplied to the $V_{CC}$ input of the microprocessor 46. The regulated +5 V is connected to the microprocessor 46, as well as to a standby (STBY) input. A parallel resistor 120, capacitor 122 and Zener diode 124 combination is connected between the microprocessor +5 V bus 118 and ground. The Zener diode 124 has a 5.1 volt reverse breakdown voltage, while the capacitor 122 is sufficiently large to sustain DC power to the microprocessor 46 during open subscriber loop intervals. Open loop intervals may occur during the use of the dial pulser 34, or when the central office 12 breaks the subscriber line 14 during an open network interval. The manner in which an open subscriber loop affects the supply voltage to the microprocessor 46 will be explained in detail below.

The dial pulser 34 comprises a PNP transistor 126 connected in series between the hook switch 94 and the internal signal conductor 44. A resistor network 128 biases the series transistor 126 as well as an NPN transistor 130 which drives the series transistor 126. An N-channel MOS transistor 132 has source and drain terminals connected respectively between ground and the base of the drive transistor 130. The gate of the MOS transistor 132 is connected in series with a resistor 134 to the dial pulse (DP) output of the microprocessor 46. To be discussed in more detail below, the series transistor 126 is normally in a conductive state to provide electrical continuity from the hook switch 94 to the internal signal conductor 44, but can be driven in a pulsed manner to interrupt subscriber loop current to function as a rotary dial pulser. This is advantageous for sending digits to central offices which are not equipped to receive DTMF signals.

The tone snubber 48 is connected between the internal signal line 44 and circuit ground. The tone snubber 48 comprises a parallel combination of a resistor 136 and a capacitor 138 connected between the internal signal bus 44 and the drain of an N-channel MOS transistor 140. The source of the MOS transistor 140 is grounded, while the gate thereof is connected through a resistor 142 to a programmable output (PB4) of the microprocessor 46. The PB4 output of the microprocessor is normally at a logic low level so that the transistor 140 is nonconductive and thereby effectively removes the capacitor 138 from being bridged across the internal signal line 44 and ground. The value of capacitor 138 is selected to present a very low impedance to signals in the voice and DTMF frequency ranges. In the preferred embodiment of the invention, capacitor 138 has a value of about 100 microfarads. The PB4 output of the microprocessor 46 is passively pulled up to a logic high voltage through resistor 144 to +5 V to enable operation of the tone snubber circuit 48.

The nonvolatile memory 51 comprises an electrically eraseable programmable read-only memory (EEPROM) connected to the microprocessor outputs PB0—PB3 to achieve the initial programming thereof, as well as the subsequent reading of the memory. The EEPROM 51 constitutes storage areas defining registers which are programmed to store information input by either the user, or by remote programming apparatus which can access the telephone set via the subscriber line 14 or the remote programming terminals 58. The EEPROM 51 can be programmed by the noted sources to register therein automatic number identification information, dialling pattern information, program flag information, speed dialling information, and other data to be described below.

In addition to the foregoing, the microprocessor 46 is provided with common connection points comprising PLDWN to which all microprocessor inputs may be tied. Other microprocessor ports comprise receiver mute (RM), detect, 350 Hz, 400 Hz and 440 Hz outputs. Microprocessor inputs/outputs PC0–PC7 define a bus 150 of eight conductors connected to inputs of the telephone control circuit 52.

Microprocessor outputs PD3–PD5 operate in conjunction with the local programming connections 58. A 4-lug connector 152 provides transmit-receive terminals for communicating programming information with local programming equipment to which the telephone set 10 may be connected. The programming equipment may be in nature of a personal computer, or other similar apparatus. The local programming connector 152 includes a terminal 154 clamped to about +5 V by a diode 156. The terminal 154 is also connected through a diode 158 to the PD5 port of the microprocessor 46. Connector terminal 160 carries receive information which is transmitted by the local programming apparatus and coupled by the PD4 I/O port of the microprocessor 46. A transmit port PD3 of the microprocessor 46 provides output signals coupled to a drive transistor 162, the collector of which is connected to local programming connector lug 164. Connector terminal 166 provides a common ground between the telephone set 10 and the local programming apparatus.

Figure 3B:
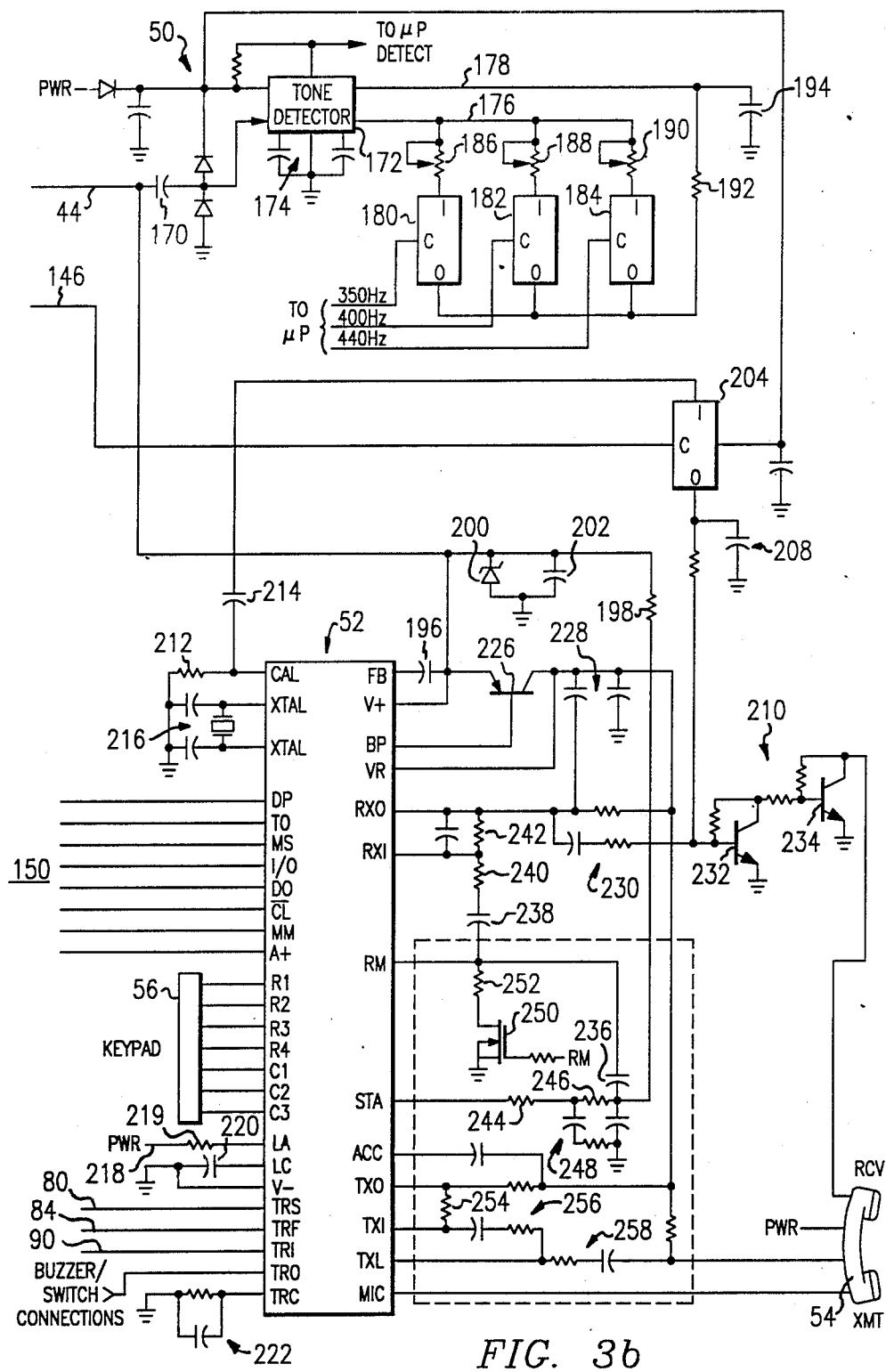

With reference now to FIG. 3b, the internal signal conductor 44 is connected through a coupling capacitor 170 to the input of the tone detector 50. In the preferred form of the invention, the tone detector 50 includes an integrated circuit device, identified as 567L, manufactured by the Signetics Corporation. The tone decoder chip 172 has connected thereto capacitors 174 which render the chip sensitivity to audio signals. The tone decoder chip 172 also includes a pair of inputs 176 and 178 between which a programmable resistance can be selected to tune the tone decoder 50 to different frequencies. In the preferred form of the invention, the tone decoder 50 is tuned to audio frequencies comprising narrow bands around 350 Hz, 400 Hz and 440 Hz.

In order to tune the tone decoder 50 to the noted frequencies, three microprocessor-controlled analog switches 180, 182 and 184 are provided for selectively connecting corresponding resistances 186, 188 and 190 between the tone decoder terminals 176 and 178. The switches 180–184 comprise MOS analog switches, identified by circuit type 4066. A resistor 192 provides an additional resistance which is in series with the selected one of the resistors 186–190. A capacitor 194 provides stability to the tone decoder chip 172 at the selected frequency of detection. The tone decoder chip 172 is supplied with unregulated power (PWR), as are analog switches 180–184. The output of the tone decoder chip 172 comprises a detect signal coupled to the detect input (PA4) of the microprocessor 46.

Central office subscriber line current carried on the internal signal conductor 44 supplies DC power to the telephone control circuit 52, via the V+input. In the preferred form of the invention, the telephone control circuit 52 comprises an integrated circuit identified by type MC34010P, manufactured by Motorola. A capacitor 196 is connected between the V+ and feedback (FB) terminals of the telephone control circuit 52. Loop current power and analog signals are supplied to other circuits associated with the telephone control circuit 52 through resistor 198. A Zener diode 200 and capacitor 202 connected between the internal signal bus 44 clamp such bus to about 18 volts. Conductor 146 associated with the microprocessor signal which drives the tone snubber 48, also provides a drive signal to an analog switch 204. The tone snubber 48 and the analog switch 204 thus operate together. The analog switch 204 has an input capacitively connected to the calibrate (CAL) port of the telephone control circuit 52, and an output connected through a resistance-capacitance network 208 to a telephone handset amplifier 210. The CAL output of the telephone control circuit 52 is normally utilized for calibration of DTMF signal levels by selecting the value of a resistor 212. However, in the present invention, a small portion of the signal output from the CAL terminal is coupled through the capacitor 214, the analog switch 204, and to the handset amplifier 210. The purpose of providing audio feedback to the receiver portion of the handset 54 will be described in more detail below. The telephone control circuit 52 is provided with a crystal and circuit components 216 to provide a fundamental 500 kHz signal thereto.

As noted in FIG. 3b, the 8-conductor bus 150 is connected to the input terminals of the telephone control circuit terminals, as identified in the FIGURE. The telephone keypad 56 is connected to the telephone control circuit 52 by four row-select conductors (R1–R4) and three column-select conductors (C1–C3). On the depression of any single key on the telephone keypad 56, one row conductor and one column conductor are made active, and are decoded by the telephone control circuit 52 for generating an associated DTMF tone. All audio and DTMF tones are input and output to the telephone control circuit 52 through the V+ pin.

The telephone control circuit 52 is provided with a power output terminal (LA) which is conventionally utilized to dissipate excess power through a resistor. According to an important feature of the invention, the power output through the LA terminal of the telephone control circuit 52 is supplied as unregulated power to other circuits of the telephone set 10. Such other circuits include, for example, the IRQ input of the microprocessor 46, the tone detector chip 172, as well as the four analog switches 180-184, 204, and the handset 54. Those circuits which do not require a high degree of regulated power are ideally suited for connection to the unregulated PWR power source. Importantly, rather than otherwise wasting the power unused by the telephone control circuit 52 in heat energy, such power is readily used by the noted circuits for useful purposes. Accordingly, the telephone set 10 of the invention can operate on lower subscriber loop currents than other comparable telephone sets. In practical applications, the telephone set 10 of the invention can thus operate with longer subscriber lines, and thus increased resistance, which reduces the loop current.

With regard to the power connections between the microprocessor 46 and the telephone control circuit 52, there is provided a series resistor 219 which serves to prevent transients generated by the microprocessor 46 from being coupled back to the internal signal bus 44. The impedance from the power input pin (V.) of the telephone control chip 52 to the power output pin (LA) is relatively low; the combination of the resistor 219 and capacitor 202 form a low-pass filter which serves to effectively remove any high-frequency transients which may be generated by microprocessor 46.

The LC terminal of the telephone control circuit 52 is connected through a capacitor 220 to ground, while the V— terminal is connected directly to circuit ground. The conductors 80, 84 and 90 associated with the ringing signals are connected respectfully to the TRS, TRF and TR1 pins of the telephone control circuit 52. An audible buzzer may be optionally connected to the TRO terminal. The TRC terminal of the telephone control circuit 52 is connected by a parallel resistor and capacitor network 222 to ground.

PNP transistor 226, connected to the FB terminal of the control circuit 52, functions as a series voltage regulator for regulating the central office voltage supplied over the subscriber line 14. Such transistor 226 provides power for the speech circuits connected to the telephone control circuit 52. Series regulator transistor 226 is driven by a BP output of the telephone control chip. A feedback voltage of the series regulator is supplied to the VR terminal of the telephone control circuit 52. Capacitors 228 serve both DC filtering and signal filtering purposes.

The telephone control chip 52 is provided with a receive output audio pin (RXO) which drives the handset amplifier 210 through a series capacitor resistor arrangement 230. The handset amplifier 210 comprises a first NPN transistor 232 which is connected in a common emitter configuration for driving a second NPN transistor 234 which is also similarly configured. The collector output of transistor 234 drives the receiver section of the handset 54. The two-transistor handset amplifier 210 provides additional gain for the handset receiver section which is especially useful in high noise level environments, such as hotel lobbies, and the like.

A receive-in pin (RXI) of the telephone control chip 52 is supplied with audio signals carried by the internal signal bus 44. Such signals are coupled to the RXI input through a capacitor 236, a capacitor 238 and a resistor 240. A parallel resistor/capacitor arrangement 242 is connected between the receive-out and receive-in pins of the telephone control chip 52. Sidetone for providing an audio feedback between the receive and transmit sections of the handset 54 is provided at the STA output of the telephone control chip 52. Sidetone signals take a path through a resistor 244, a resistor 246, and then through the capacitors 236, 238, resistor 240 to the receive input RXI of the telephone control chip 52. The sidetone signals are then output through pin RXO to the handset amplifier 210 where such sidetone signals are transformed into audio signals by the receiver section of the handset 54. The amount of sidetone coupled to the receive section of the handset 54 is controlled by the capacitor/resistor arrangement 248.

The telephone control chip 52 is further provided with a receive mute (RM) output which, when appropriately driven by the chip, prevents speech signals input via the transmit section of the handset 54 from being coupled through the telephone control chip 52 to the subscriber line 14. There is provided an additional mute control by an N-channel MOS transistor 250 connected through a resistor 252 to the receiver mute (RM) input of the chip 52. The transistor 250 is driven by a RM signal output by the microprocessor 46. When it is desired to mute audio transmit signals using transistor 250, the resistance bridged between the RM terminal and circuit ground allows a small level of subscriber line audio signals to be passed to the RXI input, and thereby reproduced in the receiver section of the handset 54. The value of resistor 252 is selected such that after the muted signal level is amplified by the handset amplifier 210, the amplified result thereof is detectable by the user of the handset 54, without being able to ascertain the message content of the words. Hence, under certain conditions the handset user may be able to hear audio speech signals occurring on the subscriber line 14, but may be unable to understand such words.

The telephone control chip 52 further includes transmit-out (TXO) and transmit-in (TXI) pins, with a resistor 254 connected therebetween. Such an arrangement sets the gain of the telephone control chip 52 with respect to signals input to the transmit section of the handset 54. The transmit-in and a TXL pin of the telephone control chip 52 are connected together through a series capacitor/resistor arrangement 256, and directed to the handset 54 by another series capacitor/resistor arrangement 258. The values of such components can be readily ascertained by those skilled in the art with reference to the data sheets of the noted telephone control chip 52. A microphone (MIC) input of the telephone control chip 52 is connected to the transmit section of the handset 54.

Figure 4A:
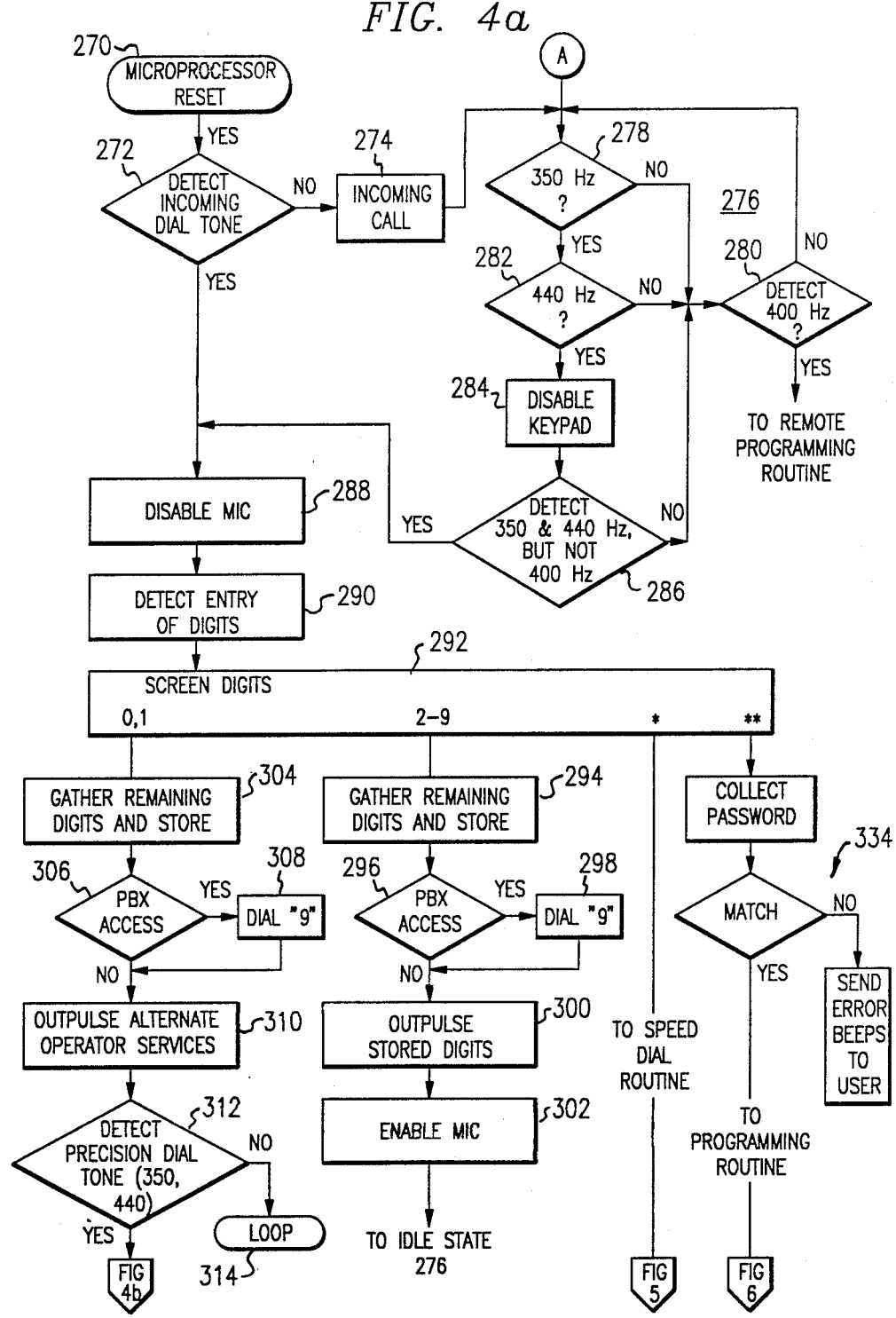

Having set forth the structural features of the invention, the programmed control thereof is next described in conjunction with FIG. 4. The program for controlling the microprocessor 46 is resident in on-board memory. Further, the microprocessor 46 is programmed so that each input/output (I/O) port PAO-7, BO-7, CO-7 and PDO-6 are associated with functions to be carried out in connection with the call processing of the telephone set 10 of the invention. The unused I/O ports of the microprocessor 46 are connected to the pull down (PLDWN) connection, and thus to ground through a resistance.

With reference now to FIG. 4, the microprocessor 46 executes a loop 270 waiting for an off-hook condition of the telephone 10. When the telephone set 10 is not in an off-hook condition, i.e., on-hook condition, the handset being in the cradle keeps hookswitch 94 in an open state. There is thus no current flow in the internal conductor 44, nor to the telephone control chip 52 or to the microprocessor 46. In such an open-circuit condition, the telephone subscriber line 14 reverts to its open-circuit voltage, which is generally in the range of about 48 V to 51 V. This voltage is sufficient to cause Zener diode 95 to conduct through resistor 98 and thence through Zener diode 104. Due to the high impedance of resistor 98 (in the preferred embodiment, 3.3 Megohms) the central office 12 continues to perceive an "on-hook" condition at the station. Current flow in the reverse direction through Zener diode 104 is sufficient to cause the cathode of this diode to assume a voltage sufficient to cause the FET 106 to begin conducting, thus clamping the RESET pin of the microprocessor 46 to ground.

When a person desiring to use the telephone set 10 removes the handset 54 from its cradle, the hookswitch 94 closes and begins conducting current to the telephone control chip 52, as well as the microprocessor 46 and other associated circuitry. This current flow causes the voltage presented at the tip 36 and ring 40 to fall to within a range of about 6 V to 10 V. This voltage change is reflected at the output of the polarity protection bridge 35. Since the voltage across Zener diode 94 is now well below its breakdown voltage, current stops flowing through diode 95, resistor 98, and diode 104. With no current flow, resistor 105 ensures that the gate voltage of FET 106 will be close to ground, and that the FET 106 will be cut off. As no current is flowing from the drain to the source of the FET 106, capacitor 108 is allowed to charge to about +5 V through a resistor (not shown) which resides within the microprocessor 46. When the voltage present on the RESET pin rises above about 4 V, the processor is released from the reset condition and allowed to begin normal functioning.

When the user is finished with the telephone call, the handset 54 is replaced on the cradle, or the hookswitch is flashed in preparation for another call. Depressing the hookswitch causes by the above described process, the voltage to rise at the cathode of Zener diode 95, and consequently to cause FET to begin conducting. The FET quickly drains the charge from capacitor 108, forcing the microprocessor 46 into reset.

Capacitor 96 prevents impulses of less than about 1 millisecond duration from resetting the microprocessor 46. Transistor 100, when driven into conduction through resistor 102 by the microprocessor 46, clamps the voltage at the gate of FET 106 to ground, thus inhibiting the resetting of the microprocessor 46. This is necessary when utilizing dial pulse operation of the telephone set 10, since tip-ring voltages rise to the full on-hook levels during dial pulsing.

When the handset 54 is lifted from the cradle of the telephone 10, the processor proceeds to program flow block 272, wherein a scan for dial tone is established. More particularly, the telephone 10 of the invention is adapted for detecting progress dial tones comprising the dual tone frequencies of 350 Hz and 440 Hz. An alternate type of dial tone of 400 Hz can also be detected by the telephone 10 of the invention. In detecting dial tone, the microprocessor 46 outputs a logic level on one output conductor (PD0-PD2) for closing one of the analog switches 180, 182, or 184. When, for example, it is desired to detect 350 Hz, the microprocessor 46 outputs a logic high on I/O port PD0 to thereby close analog switch 180. The resistor 186 and capacitor 194 then establish a frequency response of the tone detector chip 172 for detecting a similar frequency on the input signal conductor 44. The tone detector 172 includes a phase-locked loop circuit which is adapted for detecting the correspondence of the noted frequencies, and on doing so, alerts the microprocessor 46 via the PA4 port. The 400 Hz and 440 Hz frequencies are detected in a similar manner. The time period for detecting the denoted frequencies is determined in accordance with the time period by which the microprocessor 46 holds the noted outputs (PD0-PD2) to a logic high state. Generally the microprocessor 46 is programmed to hold the noted outputs high for a time period sufficient to allow the tone detector 172 to lock and detect a correspondence between the frequencies, if any.

With reference again to FIG. 4, if no dial tone is detected within a predetermined period of time, the microprocessor 46 branches from decision block 272 for the flagging of an incoming call 274, and proceeds to an idle state 276. According to the invention, since ringing voltages on the subscriber line 14 are not themselves detected by the microprocessor 46, it is thus concluded that when the handset 54 is lifted from the cradle of the telephone 10 and no dial tone is detected, the call must be incoming to the telephone set 10. According to conventional telephone signalling, the ringing signals on the subscriber line 14 are coupled to the telephone control circuit 52 and output to a buzzer or bell via the tone ringer output (TRO) terminal of such control circuit.

The detection of dial tone according to decision block 272 is substantially similar to that of the idle state 276. When detecting dial tone, or when in the idle state 276, the processor causes the analog switch 180 to be closed for about 100 milliseconds to thereby determine if a 350 Hz component frequency exists on the subscriber line 14, and thus on the internal signal conductor 44. If a 350 Hz frequency component is not detected, then a precision dial tone is presumed not to exist on the subscriber line 14, whereupon the microprocessor 46 determines if the alternate 400 Hz dial tone is present on the subscriber line 14. On a negative determination according to decision block 278, the microprocessor 46 branches to block 280 for about 100 milliseconds for detecting 400 Hz frequency components on the subscriber line 14. On a negative determination thereof, control is branched back to block 278 to detect precision dial tone frequency components. If, on the other hand, a 400 Hz signal is detected according to decision block 280, control is branched to the remote programming routine, to be discussed in more detail below.

In response to an outgoing call by the telephone 10 of the invention, the central office 12 conventionally returns precision dial tone which is detected according to programmed decision block 272. This detection, as noted above, is substantially identical to the program flow of the idle state 276. On detecting the 350 Hz component of the dial tone according to decision block 278, the program flow branches to block 282 for about 100 milliseconds for detecting the 440 Hz component of dial tone. If no such component is detected, program flow is branched back to block 280 for detecting the alternate 400 Hz dial tone. Such a sequence could occur when voice signals are transmitted on the subscriber line 14, and the frequencies thereof include a 350 Hz frequency component. If the frequencies on the subscriber line 14 include composite 350 Hz and 440 Hz components, an affirmative response is produced by program block 282, and when detection is conducted in block 272 rather than in the wait state 276, control bypasses block 284 and branches to decision block 286. The detection of incoming dial tones according to decision block 272 does not include the disabling of the key pad 284, and thus if precision dial tone is detected, but not the 400 Hz tone, the microprocessor 46 branches to program block 288. It should be noted that on an affirmative detection of dial tone according to program flow block 272, the telephone call is considered as outgoing, whereupon the microphone section of the handset 54 is disabled 288. The microphone is muted by the microprocessor 46 driving the microphone mute (MM) input of the telephone control chip 52 to a logic high state As a result, the microphone DC return path and the transmit amplifier output (TXO) are disabled Next, the microprocessor 46 is placed in a mode for detecting the entry 290 of digits by way of the telephone keypad 56. As noted in FIG. 3B the telephone keypad 56 has row and column conductors connected to the telephone control chip 52, and hence such control circuit can detect the depression and the identity of any key pushed on the telephone keypad 56. The depressed pushbutton (DP) output and the serial I/O output of the telephone control chip 52 transmits information to the microprocessor 46 concerning which keys on the keypad 56 have been depressed. The microprocessor 46 stores such information internally for use in later outpulsing information to the central office 12. Having gathered the digits keyed in by the user of the telephone 10, the programmed controlled microprocessor 46 screens the digits as shown in block 292 to ascertain the course of action to be taken in response thereto. For example, if the initial digit dialled comprises a zero or a one, a long distance telephone is identified. On the other hand, if the initial dialled digits comprise the digits two through nine, a local charge telephone call is identified. If a "*" is identified, the microprocessor 46 is routed to another subroutine for carrying out programming functions of the telephone set 10.

When the telephone set 10 of the invention detects a local call (initial digits 2-9), the remaining digits are gathered, as shown in block 294. In performing the functions by block 294, the digits entered by the telephone user are also checked against restrictions to determine if prohibitions exist for calling certain local numbers. Depending upon the desires of the owner of the telephone 10, the telephone 10 may be programmed to prevent reaching certain exchanges identified by particular 3-digit prefixes, or prevent the outpulsing of particular 7-digit directory numbers. A look-up table in the telephone set 10 is programmed to include all the telephone numbers, area codes, etc., which are to be prevented from being outpulsed over the subscriber line 14 to the central office 12. The microprocessor 46 simply consults such table during the processing of block 294, and if the dialled telephone number is found in the look-up table, program control is branched (not shown) back to block 272. On the other hand, if the dialled number can be validly outpulsed by the telephone set 10, the microprocessor 46 proceeds to decision block 296. Here, it is determined whether the telephone set 10 is operating behind a PBX switching system, in which event an initial digit, such as "9" is outpulsed 298 for obtaining an outside line to the central office 12. The digits initially input by the user of the telephone 10 are then subsequently outpulsed 300 over the subscriber line 14 and the microphone of the handset 54 in enabled 302. Return is then made by the microprocessor 46 to the idle state 276 for detecting the subsequent occurrence of a dial tone, thereby indicating a second telephone call is attempted.

The outpulsing of digits by the telephone set 10 of the invention occurs by dial pulsing or by DTMF signals, as may be required by the type of central office line equipment connected to the subscriber line 14. For rotary-type dial pulsing, and as noted above, the dial pulser 34 is driven by the dial pulse (DP) output of the microprocessor 46 to drive the series transistor 126 into conduction and cutoff at predetermined intervals. According to conventional telephony signalling, dial pulses are produced at a rate of ten pulses per second, with an off/on ratio of 60 ms/40 ms.

The telephone set 10 of the invention transmits DTMF signals representative of dialled digits using the telephone control chip 52 as the DTMF transmitter. The microprocessor 46 transmits dialled digit information via the DP and I/O inputs of the telephone control chip 52, whereupon such chip generates DTMF signals. The generated DTMF signals are output through the V+ terminal to the internal signal conductor 44 and thus to the subscriber line 14. Further details as to the particular or general operation of the telephone control chip 52 can be had by reference to published data sheets of such chip.

According to an important feature of the invention, provisions are made for controlling and completing long distance telephone calls. Such calls are screened according to block 292 and identified as long distance calls. After detecting the initial zero or one digit dialled by the telephone user, program control is branched to block 304 where the remaining digits are collected and stored for subsequent outpulsing. The gathered digits include the area code and the 7-digit directory number associated with the called party. The initial dialled zero or one digit is stripped from the dialled series and thus is absent from the stored dialled digits. Again, if the telephone set 10 is connected to a PBX, as noted by decision block 306, the digit "9" or other similar digit is dialled 308 to obtain an outside line. A predetermined wait time can be programmed to assure that the PBX switching system has secured an outside line, or another dial tone detection sequence can be inserted subsequent to program block 306. In any event, the next action by the program controlled microprocessor 46 is the outpulsing of prestored information required for connection to the alternate operator services 22. Pre-programmed within the EEPROM 51 is the long distance telephone number for connecting the telephone set 10 to such operator services 22, via any intermediate switching systems. Generally, the telephone number identifying the operator services 22 is an "800" type number which is toll free to the calling party. Thus, a telephone number such as "1-800-288-2880" is pre-programmed and subsequently output to obtain access to the operator's services 22 for completing the long distance telephone call.

Pre-programmed in the EEPROM 51 of the telephone set 10 is also an automatic number identification (ANI) which particularly identifies the telephone set 10 itself. The ANI number may be the 7-digit directory number assigned to the telephone 10 by the local telephone operating company, prefixed by a 3-digit area code. Where the telephone set 10 is utilized on the premises of a hotel, motel, dormitory or similar institution, a room number in which the telephone is situated can also be programmed into the EEPROM 51.

With the foregoing capability, the telephone set 10 of the invention causes the outpulsing 310 of the telephone number designating the alternate operators service 22, and then proceeds to a decision loop 312 for detecting dial tone transmitted from the operator services 22. Such a dial tone is used for acknowledging a request for service and indicating the further input of dialling information associated with a desired destination. If the precision dial tone (350 Hz and 440 Hz) is not detected, or if all trunks to the operator services facility 22 are busy, control is branched to a loop 314, wherein the microprocessor 46 waits further action from the user of the telephone 10.

On detecting precision dial tone, as conducted by the routine described above, the microprocessor 46 causes the outpulsing 316 of the automatic number identification, the dialled telephone number 318, and if appropriate, the room number 320, 322. Such information is collected by the alternate operator services 22 for visual display to an attendant. With this information the operator or attendant can verbally converse with the calling party to collect the appropriate information for billing purposes. For example., the calling party can transmit credit card information for verification by the operator. After all is found to be in order by the operator, the long distance telephone call is automatically completed through the operators services facility 22 to the destination, via any necessary intermediate telecommunication facility.

Control of the microprocessor 46 is then directed to the idle state 276 for the remainder of the call In the event the called party at the destination goes on-hook and the calling party using the telephone set 10 remains off-hook, the local central office 12 can return dial tone to the telephone set 10 for completing subsequent calls. In such event, the dial tone is detected in the idle state 276 and the telephone keypad 56 is disabled 284 to prevent charge-free chain calling from occurring without being processed through the alternate operators services 22. Hence, if the keypad 56 is disabled 284, no outpulsing can occur, except that which is allowed by the telephone set 10, and only then such a toll call is processed by the operator services 22 for the proper accounting and collection of revenue.

According to another feature of the invention, the telephone set 10 can be programmed to accommodate speed dialling. Speed dialling is detected by the screening of the digits pursuant to program flow block 292. The programming of speed dial numbers will be described below, but it is sufficient here to understand that numbers can be speed dialled simply by depressing the "*" keypad button followed by a single digit 0-7. The eight digits 0-7 correspond to look-up table entries which have referenced therein the directory numbers to be speed dialled.

According to FIG. 5, the digit followed by the "*" is collected, as shown by program flow block 326. The look-up table is then consulted for referencing 328 with such digit, and the directory number associated with the look-up table location is outpulsed 330. The microphone of the handset 54 is then enabled 332, whereupon the calling party can converse with the called party. The example illustrated in connection with dialling speed numbers is generally applicable for local directory numbers and not toll numbers requiring the assistance of the operator services 22. This feature of the invention still facilitates the use and revenue-generating feature of the invention, especially at airport, hotel lobbies, etc. In these situations, the owner of the telephone set 10 can essentially rent speed dial numbers to taxi or hotel services so that customers can conveniently speed dial numbers, according to instructions posted on the face of the telephone set 10. Hence, customers need not know the telephone numbers of the specific hotel or taxi services, but rather need only follow the simple posted instructions for dialling "*" followed by the specified digits.

The telephone set 10 of the invention can be manually programmed by lifting the handset 54 out of the cradle and dialling a double "". This is illustrated in block 292 of FIG. 4 for programming, for example, a speed dial number. While not shown, the programmer must also input a four-digit password. The screening and detection of the "" digit sequence places the telephone set 10 in a programming mode. When in a programming mode, and if the password is verified 334, the microprocessor 46 causes the telephone control chip 52 to return a single "beep" audio signal to the receiver portion of the handset 54, as noted by program block 340 of FIG. 6. On the other hand, if the password is incorrect, a double "beep" is returned to the programmer to indicate an error. Next, the microprocessor 46 detects the entry via the keypad 56 of one of the digits 0-7. This is the digit to which the user wishes to assign a directory number to be speed dialled. As indicated in program flow block 344, the speed dial directory digits are received for storing in the look-up table which is referenced by the single digit previously dialled. The speed dial number can be a conventional directory number, such as the taxi or hotel service, as noted above. Of course, any other speed dial number can be used, and can be of various lengths, as determined by program control After entry of the speed dial number, the same is stored 346 in the EEPROM 51. A beep tone is then returned 348 to the handset 54 receiver to signify to the programmer that the programming of a speed dial number has been successfully accomplished. The input of the digit "9" signifies the termination of the programming by the user of the telephone 10.

While not specifically shown by way of program flow blocks, the telephone set 10 of the invention can be programmed to carry out other specified functions. FIG. 7 depicts a number of programmable registers accessible by the microprocessor 46 for directing and controlling the operations thereof. For example, a dialling pattern register 350 is programmable for storing therein a string of numbers which function to direct the telephone 10 in the manner so as to reach the operator services 22. This entry can be factory-programmed, and thus need not be programmed by the user. In operation, and as described above, when the microprocessor 46 detects a zero or one as the first digit of a dialled number, the dialling pattern register 350 is consulted to determine the appropriate action. If a series of numbers are stored in the dialling pattern register 350, then such numbers are simply outpulsed. However, if a "*" resides in the dialling pattern register 350, the next number encountered by the microprocessor 46 will be interpreted as a command. In this way, the microprocessor 46 can be instructed to wait, listen for tones, or to dial numbers from another register For example, when a number is programmed into the "*3" (ANI) register 354, a register is programmed which will later be accessed and the contents thereof be used to form the dialling pattern.

As an example in programming the dialling pattern register 350, the programming thereof with "*0" will cause the microprocessor 46 to pause for detection of the precision dial tone. As noted above, this is a type of dial tone which is provided by most of the central offices, as well as by most operator services 22, as the signal to input and send the identification number.

In like manner, when the microprocessor 46 detects a "*1" in the dialling pattern, the microprocessor 46 will pause for detection of the 400 Hz dial tone. This type of dial tone is usually provided by long distance carriers to prompt the input of personal identification numbers or authorization codes. Such a digit sequence may be required if the telephone set 10 is not utilized for accessing the operator services network 22 over a direct line.

An additional register 351 accessible by the microprocessor 46 is effective to store a prefix required to access an outside line of a PBX switching system to which the telephone 10 may be connected. For example, some PBX systems require users to dial a "9" to obtain an outside line. In the event the telephone set 10 is installed behind such a PBX, the PBX prefix register 351 will be programmed with this code in the dialling pattern. Thus, when the microprocessor 46 encounters such a code in the dialling pattern, it will dial whatever has been programmed in the PBX prefix register 351.

When the microprocessor 46 encounters a sequence "*3*" in the dialling pattern, the contents of the automatic number identification register 354 are inserted into the stream of digits transmitted to the central office 12. As described above, the ANI number may be a local directory number identifying the telephone set 10, preceded by the local area code.

Dialling pattern register 356 is programmed with a room number in which the telephone set 10 is situated. Thus, when the microprocessor 46 finds a specified string of digits in the dialling pattern, the room number stored in the register 356 is inserted into such dialling pattern. It is often important that the operator services network 22 be apprised of the room number associated with the telephone set 10, in order to properly bill the call.

Dialling pattern register 358 is programmed to produce in a dialling pattern a pause of about three seconds. Thus, when the microprocessor 46 encounters a "*5", a delay of about three seconds is provided before continuing the dialling pattern. This feature is useful in the event the call to the alternate operator services 22 is being carried over a carrier which does not provide one of the tones recognized by the telephone set 10 as a network progress tone.

Dialling pattern register 360 stores the number dialled by the user of the telephone set 10 which is typically the telephone number of the destination to which the user desires communications. When the microprocessor 46 encounters a "*6" code, the contents of the register 360 are inserted into the dialling sequence, and output to the central office 12 over the subscriber line 14. In the event the "*6" sequence does not appear in the dialling pattern, the number dialled by the user will never be transmitted to the alternate operator services 22. Also, the leading "1" or "0" is removed from the long-distance number input by the telephone user. 15 A "*7" code is recognized by the microprocessor 46 when the telephone set 10 is connected to a central office which is not equipped to process DTMF signals. An associated register 362 is depicted in FIG. 7. In such event, the telephone set 10 transmits pulses similar to those transmitted by a rotary-dial telephone. In situations where the alternate operator services 22 cannot properly interpret such dial pulses, the "*7" code functions to cause all remaining digits in the dialling pattern to be transmitted as DTMF signals. This allows the telephone set 10 to dial the access number of alternate operator services 22 in rotary fashion, and then switch to DTMF signals when communicating with the alternate operator service equipment.

The microprocessor 46 is also equipped with a flag register 364 which functions as an on-off switch. The flag register can either indicate that some event has occurred, or it can control the operation of a program, or a device. In the telephone set 10 of the invention, flags are utilized to enable or restrict calls, to set up special types of dialling sequences, and to generally control the operation of the telephone set 10. The programming mode for programming the flag register 364 is accomplished by lifting the handset 54 out of the cradle and listening for dial tone. Then, a "**" followed by a pre-programmed password is entered via the keypad 56. The microprocessor 46 then compares the password to the pre-programmed contents of the password register 366, whereupon a beep is returned in about five seconds if the contents match the entered password. An "*" is then entered to signal the microprocessor 46 that program operating parameters are to be programmed, rather than speed numbers. Entry of a "1" signifies the programming of a flag, followed by a digit corresponding to the flag desired to be programmed. In the example above, program flag three was set up by the telephone set 10 for rotary dialling. Programming of other flags is a matter of specifying a different number. Next, a keypad entry of "0" or "1" signifies the turning on or off of the noted flag. The microprocessor 46 then returns a beep to the handset receiver, whereupon other flags can be programmed by entering the digit corresponding to other flags to be programmed. Programming of the flags is completed by entering a "9" via the keypad 56. In most cases, the programming of the various noted flags is utilized in conjunction with the blocking of particular telephone calls.

The rotary dialling feature of the invention can be implemented by entering the program mode ("**"), and generating an audible "beep" to apprise the user of the telephone that such a mode has been entered. The characters "*131" are then entered via the keypad 56. Another audible beep is generated by the telephone set for indicating that the programming has been accomplished, whereupon the user dials a "9" which is followed by a series of short beeps signalling that the user may hang up.

The foregoing procedure can be accomplished for programming DTMF signalling by entering the characters "*130" instead of the code "*131". The telephone set 10 of the invention may be further programmed by programming the flag registers 364 to change the rotary dialling speed from a normal speed to a slow speed, or vice versa. As referred to herein, the dialling speed comprises an interdigital time between groups of pulses. The interdigital time can be changed according to the invention between a normal speed of about 600 ms, to an extended time of about 1200 ms. The microprocessor 46 responds to this flag only if the telephone set 10 is programmed for rotary-type dialling. For a normal dialling speed, the flag register is programmed with "*110*". For a slower dialling speed, the flag register is programmed with "*111*". The slower rotary dialling speed is particularly advantageous when the telephone set 10 of the invention is utilized in conjunction with slow operating central offices.

In the majority of cases, the telephone set 10 of the invention is programmed to dispatch toll calls to the operator services 22 for assistance and accounting purposes. However, in certain situations it may be desirable to dispatch telephone calls dialled as just "0", with no trailing digits to the central office 12. Again, the programming of the flag register 364 is advantageous for this purpose. In this case, the flag register 364, when utilizing this feature of the invention, is programmed with the digit sequence "*121*" to activate the flag, whereupon collect and bill-to-third-party calls can be completed through the local operator. Also, other long-distance traffic can be routed to the alternate operator services 22 by utilizing this technique. Otherwise, the flag register 364 is programmed with "*120" for automatically routing charge calls to the operator services 22. The activation of this flag should be utilized only if local tariffs require the passing of "0-" traffic, or if the telephone subscriber line 14 is "class marked". In this instance, an operator is automatically informed that calls are not to be billed to the number when a call from that line rings into the operator's station.

The flag register 364 resident within the telephone set 10 can also be programmed to block certain calls which are desired by the owner of the telephone 10 to be prevented from completion. For example, many local central offices offer telephone numbers beginning with the "976" prefix as toll numbers. Generally, these numbers can be purchased for the purpose of offering recorded entertainment announcements which can be received via a toll call. Thus, if the local telephone company to which the telephone set 10 is connected offers such numbers, a flag can be set to deny access to such announcements. To deny access to "976" numbers, a flag register can be programmed by inputting "*141" via the keypad 56, otherwise, such flag register can allow access to the "976" numbers by programming the register with "*140".

In like manner, a flag register can be set to block access to long-distance directory assistance, which is generally a toll-type call. Access can be allowed to long-distance directory assistance operators by dialling "555-1212" which is a well-known universal number for such service. Unless a local tariff prohibits restriction for access to long-distance directory services, a flag register can be set by entering the digit sequence "*151" to deny access to any number in the form of "555-XXXX" or "NXX-555-XXXX".

Local telephone calls can also be blocked by programming a flag register with the digit sequence "*161". When set, such a flag is employed to deny access for any call beginning with the digit in the range of "2-9". As can be appreciated, the telephone set 10 of the invention generates no revenue for completing local calls, and thus it may be desirable to program such a register to prevent such calls. The completion of local calls can be permitted by reprogramming the noted flag register with "*160".

Call restriction to telephone numbers of the form "N11" or "1-N11" is also provided. One example for such call restriction is with the "411" directory numbers which connect calling parties to local directory assistance. Emergency telephone numbers, such as "911", can also be blocked by appropriate programming of the telephone set 10. Indeed, many telephone operating companies anticipate the use of telephone numbers in the range "211-911" for accessing services provided by the telephone companies. Such telephone numbers can be blocked by programming the telephone set 10 with the character sequence "*N111", in which the N designates any digit from 2-9. Thus, when programmed, telephone numbers in the range of 211-911 (and 1-211 to 1-911) will be restricted. The programming of a flag register with "*N110" will allow the completion of telephone calls within the noted range of directory numbers. As noted above, the telephone set 10 is programmed by entering the program mode "**". A digit sequence "*1" is entered via the keypad 56 for flag programming, and then an "8" is entered for programming "N11" flags. Next, the digit corresponding to the "N" is entered to restrict telephone calls having an N11 prefix. For example, if it is desired to restrict "411" and "1-411" telephone calls, a "4" would be entered into the "N" position. A "1" is then entered, or a "0" to respectively restrict or allow telephone calls to the noted directory number. If it is desired to restrict "911" directory numbers, then a similar procedure would be carried out.

A procedure similar to that of the foregoing can be carried out to program the telephone set 10 to restrict "800" or "900" toll-free calls. Thus, to block "900" toll-free calls, the telephone set 10 would be programmed with the digit string "*N001" where the "N" would be filled with a "9" digit. To allow such toll-free calls, the telephone set would be programmed with "*N000". To prohibit the completion of "800"-type calls, the digit string "*8001" would be employed for programming the flag register of the telephone set 10.

As noted above, when the telephone set 10 of the invention is utilized with a PBX-type switching system, certain registers of the telephone set can be programmed to gain access to PBX outside lines. Generally, a directory number is proceeded by a code such as "9" for obtaining dial tone on an outside line of a PBX system. In some PBX systems, as many as three digits may be used or required to gain access to outside lines. A PBX access code in the nature of "*2(PBX access code)" is utilized for such a purpose. The digits entered into the location designated by "PBX access code" comprise those digits required to gain access to the outside line of a particular PBX.

As noted previously in connection with a exemplary toll call utilizing the alternate operator services 22, the telephone set 10 can be programmed to output the contents of an automatic number identification (ANI) register 354. This register is generally programmed with the local area code and the 7-digit directory number assigned to the telephone set 10. Programming of the ANI register 354 is accomplished by placing the telephone set in a programming mode, as noted above, and inputting the character sequence "*3(area code director number)". In order for the telephone set 10 to complete telephone calls utilizing the alternate operator services 22, the ANI register must be programmed.

Also as noted above, a hotel number register is provided and the content thereof automatically outpulsed to the operator services 22 when toll-type telephone calls are placed from a hotel room telephone set of the invention. When a telephone set 10 of the invention is uniquely associated with, for example, a hotel room, the hotel number register 356 would be programmed with the number of the room. This is advantageous, as some hotels will desire to utilize the alternate operator services 22 to bill calls to the hotel, and then report such telephone usage back to the hotel on a room-by-room basis. The hotel can then bill the guest for long-distance usage at checkout time. The hotel number register 356 is programmed by the following digit sequence "*4(hotel room number)". The digit "4" in the dialling sequence signifies to the microprocessor 46 that the hotel number is to be inserted into the storage area of the dialling pattern register.

The foregoing illustrates some of the examples for programming the telephone set 10 to provide enhanced flexibility for controlling the completion of telephone calls. All the foregoing programming features can be entered via the keypad 56 of the telephone 10, by any person familiar with the programming techniques. Hence, the telephone set 10 may be vulnerable to change by any person who desires to do so, simply by dialling the appropriate digit sequence to, for example, remove the blocking capability of the telephone set to thereafter complete otherwise restricted calls.

In accordance with another feature of the invention, the telephone set 10 is provided with a password register 366 to provide a degree of security against unauthorized programming of the operating registers and the speed numbers. The password register 366 is fixed length, and factory programmed with a password "0000". The programming of the password register 366 is somewhat different than programming the other registers, as described above. The reason for this is that if a user accidentally misprograms any of the other registers of the telephone set 10, they can be simply reprogrammed correctly. If, however, the password register is misprogrammed, reprogramming thereof is not permitted.

In order to program the password register 366, the telephone set 10 is placed in the programming mode by dialling the digit sequence "**", and listening for a "beep" tone. Then, the digit sequence "*5" is input for accessing the password register 366. The user selects any four random digits as a password, and inputs the same via the keypad 56 for programming the password register 366. After inputting the password, the same password is again input by the user to verify that the two digit sequences are identical. If the password entries are exactly the same, a "beep" will be presented to the user to signify that the next programming step can be carried out. A series of short beeps presented to the user indicates that the two passwords are different, whereupon the telephone set 10 must be hung up, and the procedure started over anew. If, on the other hand, the two passwords are exactly alike, the user inputs the digit "9" to complete the programming sequence. If the user places the handset 54 on-hook before inputting the digit "9", the password register 366 will also not be programmed.

Once the password register 366 is programmed, the sequence for programming the other registers are slightly modified. As before, the programming mode is entered by inputting the digit sequence "**". However, instead of a "beep", the password digit sequence must be input, and if correctly input, the user will be presented with a single "beep", as described above. Thus, with the use of a password register 366, no programming of the various registers can be made, except by the entry of the correct password digit sequence.

The telephone set 10 of the invention is also provided with a number of registers which are not programmable with the telephone keypad 56. Such registers comprises a serial number register 368 which is pre-programmed with a number which uniquely identifies the particular telephone set. Each telephone set 10 is programmed at the factory with a different serial number.

In addition to the password register 366 noted above, the telephone set 10 includes a multi-level security system for further enhancing the security of the telephone set 10. A security level register 370 is utilized when it is desired to provide another person access to some, but not all, of the program registers of the telephone set 10. The telephone set 10 can, for example, be initially set at a security level which allows all registers to be programmed, and thus no registers are restricted from access. Subsequently, the security level register 370 may be programmed for further restricting access to various of the registers. The security level register 370 is only remotely programmed by entering the following digit sequence "*8(security level)". The security level register can be programmed with four levels, each identified as follows. A level three is a default security level, wherein all registers may be programmed, including the security level register 370 itself. A level two programming of the security register 370 allows only the holder of the programming password to program the speed numbers, the flag register 364, the automatic number identification register 354, the hotel room number register 356 and the PBX prefix register 351. All other registers are locked out from being programmed, even though the user knows the programming password.

A level one programming of the security register 370 allows programming of only the speed number register, thereby locking out all other programming registers. A level zero prevents programming of all registers, including the speed number registers. In other words, the programming mode cannot be entered at all. Of course, speed numbers which have previously been programmed may be freely used. It is also highly important to assure the integrity of the security feature to prevent reprogramming of the various security levels. In other words, if, for example, the security level register were programmed initially with a level three, it could not be subsequently programmed by the user to a more permissive level. Reprogramming of the security level register can be conducted only remotely by the remote programming technique described below.

With reference again to FIG. 4, the microprocessor 46 proceeds to the speed number dial routine if a single "*" is detected, or to a programming routine if a "**" is detected. This is noted at program flow block 292. Speed numbers and other registers are programmed in accordance with the procedures described above. Hence, further analysis or description thereof is unnecessary.

Remote programming of the telephone set 10 of the invention can be accomplished by the use of remotely located programming facilities for transmitting programming signals to the telephone set 10 via the subscriber line 14. Programming of the telephone set 10 in this manner requires the assistance of a person to remove the handset 54 from the cradle of the telephone. Remote programming by such facilities is detected by the microprocessor 46 in the idle state 276, where 400 Hz tones are detected according to block 280. The microprocessor 46 then branches to the remote programming routine, as shown in FIG. 8. Security measures are also taken in the remote programming mode to assure that unauthorized persons cannot modify the programmable registers of the telephone set 10.

According to FIG. 8, program flow block 380 illustrates that the microprocessor 46 generates a random number. Such a number can be generated by starting a counter, stopping it at a random count, and noting the contents. In the preferred form of the invention, the random number comprises two digits. According to program flow block 382, the two-digit number is mutated according to a particular algorithm to change such number. Such a mutation may be carried out by a predefined mathmatical equation. After being mutated, the result thereof yet comprises a two-digit number which is stored for later comparison. The mutated two-digit number is transmitted 384 by the telephone set 10 over the subscriber line 14 to the remotely located programming facility 28.

In the preferred form of the invention, the remote programming facility 28 can be personal computer coupled to a central office 24 via 400 Hz transmission facilities 30 and DTMF decoding receiver facilities 32. The microprocessor 46 then causes the mutated numbers to be transmitted by the speech network control chip 52 as DTMF tones. While not shown by the flow chart diagram of FIG. 8, the remotely located programming apparatus 28 decodes the DTMF tones by the decoder 32, and presents the corresponding digital numbers to the personal computer 28. A wait routine 386 is encountered by microprocessor 46 for return information. In practice, the personal computer 28 has programmed therein a routine for mutating the two-digits in the identical manner as mutated pursuant to program flow block 382. After mutation, the personal computer 28 transmits the mutated number as two 400 Hz signals, using the 400 Hz modulator 30. According to program flow block 388, the telephone set 10 receives and detects such 400 Hz signals by the tone detector 50. The two digits encoded by the 400 Hz tone are decoded and compared with the mutated number previously stored according to program flow block 382. On a mismatch of the comparison, the microprocessor 46 is removed from the remote programming mode and is directed to the idle state 276. On an affirmative comparison of the mutated numbers, the microprocessor 46 is placed in an internal programming mode and is prepared to receive programming information 390. At this point in the program flow, information can be transmitted via 400 Hz tones from the personal computer 28, through any intermediate central office switching systems 24, 12 and to the telephone set 10.

Those skilled in the art will appreciate that the transmission of information from the personal computer 28 to the telephone set 10 of the invention may be by 400 Hz asynchronous mode, in which start bits, data bits, parity and stop bits are utilized to effect such transmission. Such a protocol is well-known to those in the art. The actual programming information transmitted from the remote programming facility 28 to the telephone set 10 is stored in the EEPROM 51, and is thereby permanently available to the microprocessor 46, irrespective of electrical power supplied thereto.

On detecting an end of transmission 392, the microprocessor 46 is taken back to the idle state 276. End of transmission codes may be in the nature of a digit "9" to signify an end and to discard changes. On the other hand, the entering of digit "*9" may signify an end and save the changes. While the noted remote programming capability may be limited to low data rates, e.g., four bits per second, the amount of data transmitted is relatively small, and thus the telephone set 10 can be programmed within a few minutes.

A procedure similar to the foregoing can be followed for programming the telephone set 10 using local, rather than remote, programming facilities. Essentially, the programming connections 58 shown in FIG. 3a can be employed to effect the programming of the various registers, including the EEPROM 51. An RS-232 type of cable can be connected to the programming connection 58 for inputting programming data to the telephone set 10. Personal computer type of facilities can be utilized for connection to the local programming connections 58 and for transmitting 1022 baud serial data to the telephone set 10.

From the foregoing, disclosed is a telephone set especially adapted for facilitating toll-type telephone calls. The telephone set of the invention is particularly adapted for detecting the placement of long distance telephone calls, and for connection to alternate operator service facilities. Such a connection is automatically effected and is transparent to the user of the telephone set. A primary technical advantage of the invention is thus achieved, in that monetary charges for the telephone call can be appropriately allocated, thereby providing a source of revenue for the owner of the telephone set. Various other technical advantages achieved by the invention are its simplicity of design which allows it to be easily manufactured at a low cost.

While the preferred embodiment of the invention has been disclosed with reference to a specific telephone set, it is to be understood that many changes in detail may be made as a matter of engineering choices without departing from the spirit and scope of the invention as defined by the appended claims.

What is claimed is:

1. A telephone set, comprising:
    an interface for connecting said telephone set to a telephone line;
    a handset for converting electrical signals to audio signals and for converting audio signals to electrical signals for transmission over said telephone line;
    a detector for detecting predetermined dialled information which universally defines a toll call;
    a receiver for receiving dialled digits representative of a destination defined as a primary destination, and for storing said primary destination digits;
    a processor responsive to said detection of said predetermined dialled information for outpulsing over said telephone line a digit sequence representative of an alternate destination; and
    said processor causing an outpulsing of said stored digits of said primary destination over said telephone line for placing a user of said telephone set in communication with a called party associated with said stored digits.

2. The telephone set of claim 1, further including means in said telephone set for storing an identification code of said telephone set and for outpulsing said code to said alternate destination.

3. The telephone set of claim 2, further including means for detecting an acknowledgment of a request for service of said alternate destination.

4. The telephone set of claim 3, further including means for executing a sequence of ordered operations comprising outpulsing digits for accessing said alternate destination, then outpulsing said identification code, then detecting said acknowledgement of said request, then outpulsing said digits corresponding to said primary destination.

5. The telephone set of claim 3, wherein said acknowledgement detecting means includes means for detecting a dial tone.

6. The telephone set of claim 1, further including means for powering processor circuits of said telephone set with power supplied over said telephone line.

7. The telephone set of claim 6, wherein said telephone set includes a speech network control circuit powered with said telephone line power, and a call processing circuit connected to receive power in series with said speech network control circuit.

8. The telephone set of claim 7, wherein said call processing circuit comprises a microprocessor.

9. The telephone set of claim 1, further including means for storing information in said telephone set, and means external to said telephone set for programming said storing means with information.

10. The telephone set of claim 9, further including means for programming said storage means via said telephone line.

11. The telephone set of claim 9, further including a jack attached to said telephone set for connecting thereto said external programming means.

12. The telephone set of claim 1, further including means responsive to predefined dialled digits for preventing the outpulsing of the same over said telephone line.

13. The telephone set of claim 1, further including means for monitoring said telephone line during off-hook conditions of a handset associated with said telephone set for detecting an attempted chain call and for preventing outpulsing of digits to thereby prevent said chain cell.

14. The telephone set of claim 1, wherein said processor includes a memory which stores a digit sequence comprising a telephone member of an operator service defining said alternate destination.

15. The telephone set of claim 1, wherein the accessing of the alternate destination is carried out transparent to the user thereof by the operation of the processor in response to the input of predetermined dialled information defining a long distance telephone call.

16. A telephone set, comprising:
    means for connecting said telephone set to a telephone line;
    a handset for converting electrical signals to audio signals and for converting audio signals to electrical signals for transmission over said telephone line;
    means responsive to a manual input of digits for outpulsing digit information over said telephone line;
    a processor in said telephone set for processing incoming telephone calls to said telephone set and outgoing calls from said telephone set, said processor including means for storing information for use in processing telephone calls; and
    said processor being responsive to remote programming signals generated external to said telephone set for programming said storage means.

17. The telephone set of claim 16, wherein said processor includes a plurality of registers programmable by a remote programming apparatus, and further including means responsive to the contents of ones of said registers for processing outgoing telephone calls from said telephone in accordance with the contents of said registers.

18. The telephone set of claim 16, further including a jack attached to said telephone set for providing external programming signals thereto.

19. The telephone set of claim 16, further including means for detecting dial tone received over said telephone line, means for detecting pulsed dial tone signals from a remote programming apparatus and means for decoding said pulsed dial tone signals into predefined digits to be stored in said storage means.

20. A telephone set for use in completing toll telephone calls, comprising:
    an interface for connecting said telephone set to a telephone line;
    a handset for converting electrical signals to audio sounds and for converting audio sounds to electrical signals for transmission over said telephone line;
    means responsive to a manual input by a user of said telephone set for outpulsing digit information over said telephone line;
    a program controlled processor in said telephone set for controlling incoming and outgoing telephone calls, said processor including a storage register for storing a unique code identifying said telephone set, a storage register for storing digits dialled by the user for communicating with a primary destination, a register for storing digit information of a secondary destination for accessing an operator service;
    means responsive to an input by the user of digit information corresponding to a toll call to a primary destination for temporarily storing said digits in said user dialled digit storage register, and for outpulsing said digits followed by said identity code; and
    means for detecting a tone issued from said secondary destination and for outpulsing the user dialled digits.

21. The telephone set of claim 20, further including means for remotely programming said unique identity code register.

22. The telephone set of claim 21, further including means for programming said unique identity code register using said telephone line.

23. A telephone set, comprising:
    an interface for connecting said telephone set to a telephone line;
    a handset for converting electrical signals to audio sounds and for converting audio sounds to electrical signals for transmission over said telephone line;
    means responsive to a manual input of digits for outpulsing digit information over said telephone line;
    a speech network control circuit for processing ringing signals and DTMF signals, and transmit and receive audio signals, said speech network control circuit being connected to said telephone line and to said handset;
    a program-controlled processor for processing incoming and outgoing telephone calls; and
    means for connecting DC power from said telephone line to a power input of said speech network control circuit and for connecting a power output of said speech network control circuit to said processor so that said processor receives telephone line current power in series with said speech network control circuit.

24. The telephone set of claim 23, further including low-pass filter connected to said power connection of said speech network control circuit and said processor.

25. The telephone set of claim 23, wherein said program-controlled processor comprises low current MOS circuits.

26. A telephone set, comprising:
- means for connecting said telephone set to a telephone line;
- a handset for converting electrical signals to audio sounds and for converting audio sounds to electrical signals for transmission over said telephone line;
- means responsive to a manual input of digits for outpulsing digit information over said telephone line;
- processor-controlled circuits connected to said telephone line and to said handset for permitting incoming and outgoing telephone calls;
- means for detecting a first occurrence of a dial tone transmitted on said telephone line for signalling the initiation of a telephone call;
- means for monitoring said telephone line during a telephone conversation for a second occurrence of a dial tone signal on said telephone line; and
- means responsive to the detection of a second occurrence of a dial tone for preventing the outpulsing of digit information from said telephone set to thereby prevent chain calling.

27. The telephone set of claim 26, further including means for permitting audio signals incoming on said telephone line to be coupled to a receiver of said handset.

28. The telephone set of claim 26, further including means for scanning said telephone line for detecting tones in the range of 350–440 Hz.

29. The telephone set of claim 26, further including means responsive to an off-hook condition of said handset for resetting a processor.

30. The telephone set of claim 29, further including a rotary dial pulser, and means for preventing the resetting of said processor controlled circuits during rotary dial pulsing.

31. The telephone set of claim 26, further including a snubber for preventing audio signals from being output from said telephone set over said telephone line.

32. The telephone set of claim 31, wherein said snubber comprises a capacitor switchable between an audio conductor connected to the telephone line, and a circuit ground.

33. A method of placing a toll-type telephone call, comprising the steps of:
- storing within a telephone set a directory number associated with an operator services facility;
- storing within the telephone set an identification number of the telephone set from which the call is being placed;
- storing a number dialled using said telephone set; and
- automatically outpulsing by said telephone set said operator services directory number, then said identification number and then said dialled number.

34. The method of claim 33, further including detecting an acknowledgement of a request for service from the operator services facility before outpulsing said identification number.

35. The method of claim 33, wherein said outpulsing is automatic, without control of a user of the telephone set.

36. The method of claim 33, further including placing said call from a non-coin type of telephone set.

37. The method of claim 33, wherein said telephone set is powered from a telephone line to which it is connected, and further including storing said operator services directory number and said identity in a nonvolatile memory so that when the telephone set is removed from the telephone line, the telephone set can later be reconnected to a telephone line and toll-type calls can be resumed without reprogramming said telephone set.

38. A telephone set, comprising:
- means for connecting said telephone set to a telephone line;
- a handset for converting electrical signals to audio signals and for converting audio signals to electrical signals for transmission over said telephone line;
- means for detecting predetermined dialled information defining a toll call;
- means for receiving dialled digits representative of a destination defined as a primary destination, and for storing said primary destination digits;
- means responsive to said detection of said predetermined dialled information for outpulsing over said telephone line a digit sequence representative of an alternate destination;
- means for outpulsing said stored primary destination digits over said telephone line for placing a user of said telephone set in communication with a called party associated with said stored digits;
- means for storing information in said telephone set; and
- means external to said telephone set for programming said storing means with information.

39. A telephone set, comprising:
- means for connecting said telephone set to a telephone line;
- a handset for converting electrical signals to audio signals and for converting audio signals to electrical signals for transmission over said telephone line;
- means for detecting predetermined dialled information defining a toll call;
- means for receiving dialled digits representative of a destination defined as a primary destination, and for storing said primary destination digits;
- means responsive to said detection of said predetermined dialled information for outpulsing over said telephone line a digit sequence representative of an alternate destination;
- means for outpulsing said stored primary destination digits over said telephone line for placing a user of said telephone set in communication with a called party associated with said stored digits; and
- means for monitoring said telephone line during off-hook conditions of a handset associated with said telephone set for detecting an attempted chain call and for preventing outpulsing of digits to thereby prevent said chain cell.

40. The telephone set of claim 39, wherein said monitor means includes means for sensing a second occurrence of a dial tone on said telephone line after an initial off-hook condition of said handset.

41. The telephone set of claim 39, further including a program controlled processor, and means for resetting said processor in response to off-hook conditions of said handset to prevent chain calling.

42. A telephone set, comprising:

means for connecting said telephone set to a telephone line;
a handset for converting electrical signals to audio signals and for converting audio signals to electrical signals for transmission over said line;
means responsive to a manual input of digits for outpulsing digit information over said telephone line;
means for processing incoming telephone calls to said telephone set and outgoing calls from said telephone set, said processing means including means for storing digit information for use in processing telephone calls;
a jack attached to said telephone set for providing external programming signals thereto; and
means responsive to a remote programming apparatus external to said telephone set for programming said storage means.

43. A telephone set, comprising:
means for connecting said telephone set to a telephone line;
a handset for converting electrical signals to audio signals and for converting audio signals to electrical signals for transmission over said line;
means responsive to a manual input of digits for outpulsing digit information over said telephone line;
means for processing incoming telephone calls to said telephone set and outgoing calls from said telephone set, said processing means including means for storing digit information for use in processing telephone calls;
means responsive to remote programming apparatus external to said telephone set for programming said storage means; and
means for detecting dial tone received over said line, and means for detecting pulsed dial tone signals from said remote programming apparatus for detecting predefined digits to be stored in said storage means.

44. The telephone set of claim 43, wherein said storage means comprises a plurality of programmable registers, and further including means for verifying the contents of said programmable registers, said verifying means including means for reading ones of said registers and transmitting DTMF signals representative of said contents to said remote programming apparatus.

45. A telephone set for use in completing toll telephone calls, comprising:
means for connecting said telephone set to a telephone line;
a handset for converting electrical signals to audio sounds and for converting audio sounds to electrical signals for transmission over said line;
means responsive to a manual input by a user of said telephone set for outpulsing digit information over said telephone line;
a program controlled processor in said telephone set for controlling incoming and outgoing telephone calls, said processor including a storage register for storing a unique code identifying said telephone set, a storage register for storing digits dialled by the user for communicating with a primary destination, a register for storing digit information of a secondary destination for accessing an operator service;
means responsive to an input by the user of digit information corresponding to a toll call to a primary destination for temporarily storing said digits in said user dialled digit storage register, and for outpulsing said digits followed by said identity code;
means for detecting a tone issued from said secondary destination for outpulsing the user dialled digits;
means for remotely programming said unique identity code register; and
means for programming said unique identity code register using said telephone line.

46. The telephone set of claim 45, further including means for mutating a number for use in establishing communications between the telephone set and the remote programming means.

47. A method for placing a toll-type telephone call, comprising the steps of:
storing within a telephone set a directory number associated with an operator services facility;
storing within the telephone set an identity of the telephone set from which the call is being placed;
storing a number dialled using said telephone set; and
automatically outpulsing said operator services directory number, then said identification number and then said dialled number without control thereof by a user of the telephone set.

48. A telephone set, comprising:
means for connecting said telephone set to a telephone line;
a handset for converting electrical signals to audio sounds and for converting audio sounds to electrical signals for transmission over said telephone line;
means responsive to a manual input of digits for outpulsing digit information over said telephone line;
a speech network control circuit for processing ringing signals and DTMF signals, and transmit and receive audio signals, said control circuit being connected to said telephone line and to said handset;
a program-controlled processor for processing incoming and outgoing telephone calls;
means for connecting DC power from said telephone line to a power input of said speech network control circuit and for connecting a power output of said speech circuit to said processor so that said processor receives telephone line current power in series with said speech network control circuit; and
a low-pass filter connected to said power connection of said speech network control circuit and said processor.

49. A telephone set, comprising:
means for connecting said telephone set to a telephone line;
a handset for converting electrical signals to audio sounds and for converting audio sounds to electrical signals for transmission over said telephone line;
means responsive to a manual input of digits for outpulsing digit information over said telephone line;
a speech network control circuit for processing ringing signals and DTMF signals, and transmit and receive audio signals, said control circuit being connected to said telephone line and to said handset;
a program-controlled processor for processing incoming and outgoing telephone calls, said processor being a low current MOS circuit; and
means for connecting DC power from said telephone line to a power input of said speech network control circuit and for connecting a power output of said speech circuit to said processor so that said processor receives telephone line current power in series with said speech network control circuit.

50. A telephone set, comprising:

an interface for connecting said telephone set to a telephone line;

a handset for converting electrical signals to audio signals and for converting audio signals to electrical signals for transmission over said telephone line;

a detector for detecting a predetermined sequence of digits which universally define a toll call;

a receiver for receiving dialled digits representative of a destination defined as a primary destination, and for storing said primary destination digits;

a processor responsive to said detection of said predetermined digit sequence for outpulsing over said telephone line a digit sequence representative of an alternate destination; and said processor causing an outpulsing of said stored digit sequence of said primary destination over said telephone line for placing a user of said telephone set in communication with a called party associated with said stored digits.

51. A telephone set, comprising:

means for connecting said telephone set to a telephone line;

a handset for converting electrical signals to audio signals and for converting audio signals to electrical signals for transmission over said telephone line;

means for detecting a predetermined sequence of digits defining a toll call;

means for receiving dialled digits representative of a destination defined as a primary destination, and for storing said primary destination digits;

means responsive to said detection of said predetermined digit sequence for outpulsing over said telephone line a digit sequence representative of an alternate destination;

means for outpulsing said stored digit sequence over said telephone line for placing a user of said telephone set in communication with a called party associated with said stored digits;

means for storing information in said telephone set; and means external to said telephone set for programming said storing means with information.

52. A telephone set, comprising:

means for connecting said telephone set to a telephone line;

a handset for converting electrical signals to audio signals and for converting audio signals to electrical signals for transmission over said telephone line;

means for detecting a predetermined sequence of digits defining a toll call;

means for receiving dialled digits representative of a destination defined as a primary destination, and for storing said primary destination digits;

means responsive to said detection of said predetermined digit sequence for outpulsing over said telephone line a digit sequence representative of an alternate destination;

means for outpulsing said stored digit sequence over said telephone line for placing a user of said telephone set in communication with a called party associated with said stored digits; and means for monitoring said telephone line during off-hook conditions of a handset associated with said telephone set for detecting an attempted chain call and for preventing outpulsing of digits to thereby prevent said chain call.

* * * * *

UNITED STATES PATENT AND TRADEMARK OFFICE
CERTIFICATE OF CORRECTION

PATENT NO. : 4,947,422
DATED : August 7, 1990
INVENTOR(S) : Benjamin A. Smith et al.

It is certified that error appears in the above-identified patent and that said Letters Patent is hereby corrected as shown below:

Column 5, line 54, after "conductor", insert --92--.

Column 9, line 22, change "(V.) to --(V+)--.

Column 17, line 59, after "user.", delete --15--.

Column 20, lines 53-54), change "*3(area code director number)" to --*3(area code + director number)--.

Signed and Sealed this

Twenty-ninth Day of September, 1992

Attest:

DOUGLAS B. COMER

Attesting Officer

Acting Commissioner of Patents and Trademarks